US008909725B1

(12) United States Patent
Sehn

(10) Patent No.: US 8,909,725 B1
(45) Date of Patent: Dec. 9, 2014

(54) CONTENT DELIVERY NETWORK FOR EPHEMERAL OBJECTS

(71) Applicant: Snapchat, Inc., Venice, CA (US)

(72) Inventor: Timothy Sehn, Marina Del Ray, CA (US)

(73) Assignee: Snapchat, Inc., Venice, CA (US)

( * ) Notice: Subject to any disclaimer, the term of this patent is extended or adjusted under 35 U.S.C. 154(b) by 0 days.

(21) Appl. No.: 14/201,707

(22) Filed: Mar. 7, 2014

(51) Int. Cl.
*G06F 15/16* (2006.01)
*H04L 29/08* (2006.01)

(52) U.S. Cl.
CPC ............ *H04L 67/26* (2013.01); *H04L 67/2842* (2013.01)
USPC ........................................ 709/206

(58) Field of Classification Search
CPC ..... H04W 4/02; H04W 88/182; H04W 40/20; H04W 8/18; H04L 67/22; H04L 67/2847; H04L 67/26; H04L 67/101; H04L 67/1085; H04L 67/104; H04L 51/38; H04L 12/1825
USPC .......................................................... 709/206
See application file for complete search history.

(56) References Cited

U.S. PATENT DOCUMENTS

| | | |
|---|---|---|
| 2009/0132453 A1* | 5/2009 | Hangartner et al. ............ 706/46 |
| 2010/0161831 A1* | 6/2010 | Haas et al. ..................... 709/235 |
| 2011/0145564 A1* | 6/2011 | Moshir et al. .................. 713/154 |
| 2013/0059607 A1* | 3/2013 | Herz et al. .................. 455/456.3 |
| 2013/0071093 A1* | 3/2013 | Hanks et al. .................. 386/295 |
| 2013/0290443 A1* | 10/2013 | Collins et al. ................. 709/206 |
| 2013/0344896 A1* | 12/2013 | Kirmse et al. ............. 455/456.3 |
| 2014/0011538 A1* | 1/2014 | Mulcahy et al. ........... 455/553.1 |
| 2014/0057660 A1* | 2/2014 | Wager, Garrick .......... 455/456.3 |
| 2014/0122658 A1* | 5/2014 | Haeger et al. ................ 709/219 |
| 2014/0122787 A1* | 5/2014 | Shalvi et al. .................. 711/103 |
| 2014/0155102 A1* | 6/2014 | Cooper et al. ............. 455/456.3 |

\* cited by examiner

*Primary Examiner* — Larry Donaghue
(74) *Attorney, Agent, or Firm* — Cooley LLP

(57) ABSTRACT

A computer implemented method includes receiving an object scheduled for automatic deletion after a specified viewing period, a specified number of views or a specified period of time. Object push criteria are evaluated. The object is pushed to an edge server cache in response to evaluating. The object is served in response to a request for the object.

12 Claims, 3 Drawing Sheets

CONTENT DELIVERY NETWORK FOR EPHEMERAL OBJECTS

FIELD OF THE INVENTION

This invention relates generally to network communications. More particularly, this invention relates to a content delivery network for ephemeral objects.

BACKGROUND OF THE INVENTION

Traditional Content Delivery Networks (CDNs) work on a pull-based model. The CDN advertises a Hypertext Transport Protocol (HTTP) endpoint to the internet. Client requests are then routed to the closest (in internet terms) endpoint. If the target of the HTTP request is not in the cache of an endpoint, the CDN makes an origin (where the object is mastered) request, pulls the target of the HTTP request to the endpoint and caches the payload of the request. This adds additional latency. If the target of the HTTP request is in the cache, the request is served from the endpoint. These requests are served with lower latency because the object does not need to travel as far. Objects in the cache are evicted based on a predetermined model, such as a Least Recently Used model.

This approach is tailored for large objects that are read many times. This approach is not suitable for objects that are either read once or read very few times.

In view of the foregoing, it would be desirable to provide improved techniques for distributing ephemeral objects in a content delivery network.

SUMMARY OF THE INVENTION

A computer implemented method includes receiving an object scheduled for automatic deletion after a specified viewing period, a specified number of views or a specified period of time. Object push criteria are evaluated. The object is pushed to an edge server cache in response to evaluating. The object is served in response to a request for the object.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
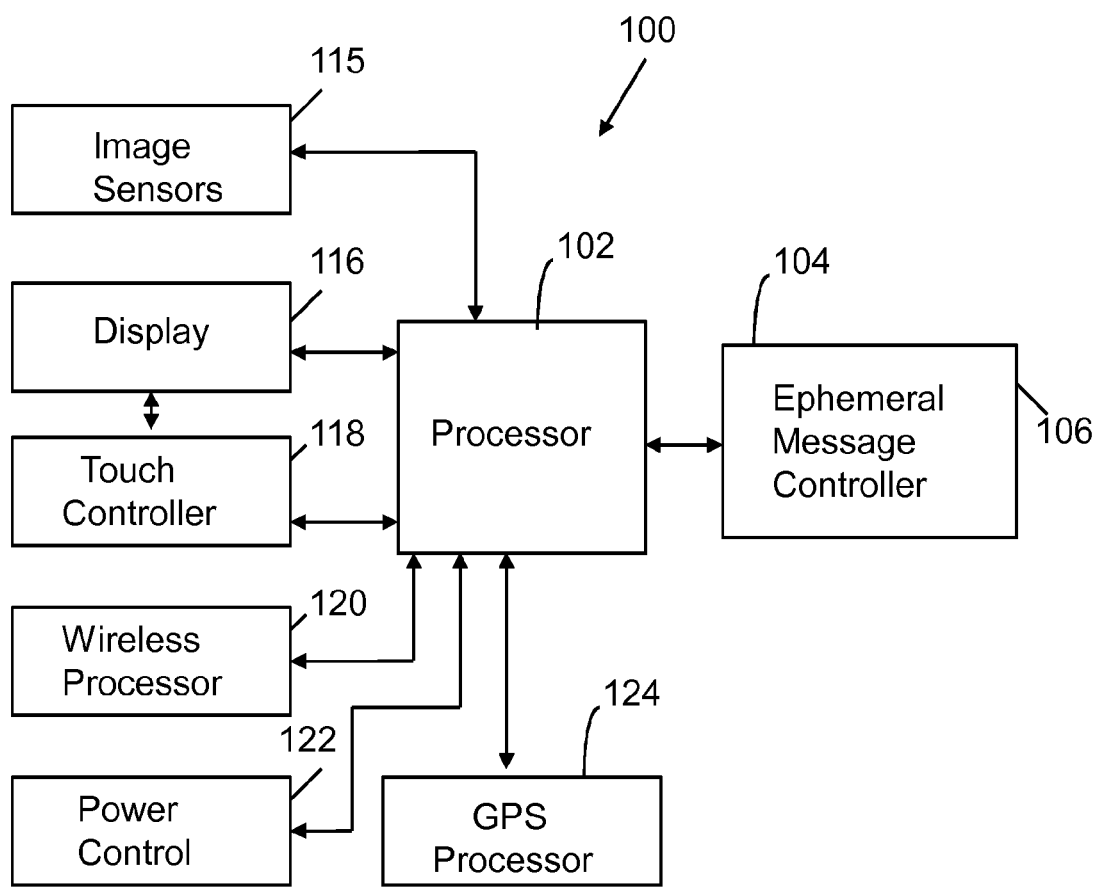
FIG. 1 illustrates a client device utilized in accordance with an embodiment of the invention.

FIG. 1 illustrates an electronic device 100 utilized in accordance with an embodiment of the invention. In one embodiment, the electronic device 100 is a smartphone with a processor 102 in communication with a memory 104. The processor 102 may be a central processing unit and/or a graphics processing unit. The memory 104 is a combination of flash memory and random access memory. The memory 104 stores an ephemeral message controller 106. The ephemeral message controller 106 includes executable instructions to display ephemeral messages. An ephemeral message may be a text, an image, a video and the like. The display time for the ephemeral message is typically set by the message sender. However, the display time may be a default setting or a setting specified by the recipient. Regardless of the setting technique, the message is transitory. That is, the message is automatically deleted after a specified viewing period, a specified number of views or a specified period of time (e.g., 24 hours). The ephemeral message controller 106 controls deletion of the object at the client device 100, while other controllers delete network instances of the object, as discussed below.

The processor 102 is also coupled to image sensors 115. The image sensors 115 may be known digital image sensors, such as charge coupled devices. The image sensors capture visual media, which is presented on display 116.

A touch controller 118 is connected to the display 116 and the processor 102. The touch controller 118 is responsive to haptic signals applied to the display 116. In one embodiment, the ephemeral message controller 106 monitors signals from the touch controller 118. If haptic contact is observed by the touch controller 118 then an ephemeral message is displayed until its automatic deletion time is reached. The electronic device 100 may also include other components commonly associated with a smartphone, such as a wireless signal processor 120 to support wireless communications, a power control circuit 122 and a global positioning system processor 124.

Figure 2:
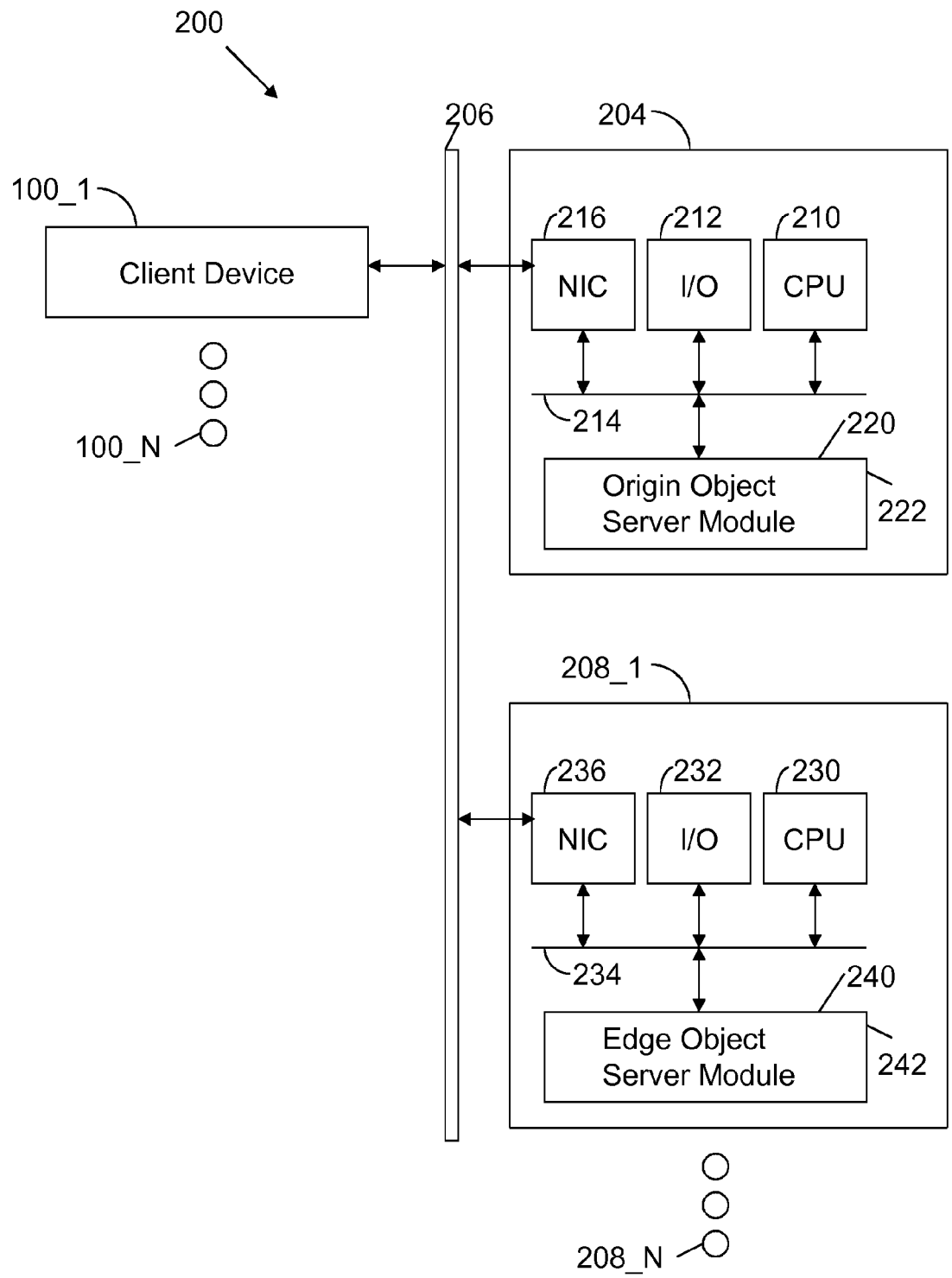
FIG. 2 illustrates a system configured in accordance with an embodiment of the invention.

FIG. 2 illustrates a system 200 configured in accordance with an embodiment of the invention. The system 200 includes a set of client devices 100_1 through 100_N. The client devices 100 are connected to a network 206, which is any combination of wireless and wired network communication devices. A server 204 is also connected to the network 206. The server 204 includes standard components, such as a central processing unit 210 and input/output devices 212 connected via a bus 214. The input/output devices 212 may include a keyboard, mouse, display and the like. A network interface circuit 216 is also connected to the bus 214 to provide connectivity to network 206. A memory 220 is also connected to the bus 214. The memory 220 includes modules with executable instructions, such as an origin object server module 222. The origin object server module 222 implements content delivery network operations for ephemeral objects, as discussed below. The memory 220 may also include executable instructions to support the receipt, distribution and deletion of ephemeral objects.

FIG. 2 also includes a set of edge servers 208_1 through 208_N. Each edge server 208 includes standard components, such as a central processing unit 230, input/output devices 232, a bus 234 and network interface circuit 236 to provide connectivity to network 206. A memory 240 is also connected to the bus 234. The memory 240 stores executable instructions, such as an edge object server module 242. The edge object server module 242 includes executable instructions to communicate with the origin object server module 222, receive ephemeral objects, serve ephemeral objects and automatically delete ephemeral objects after a specified viewing period, a specified number of views or a specified period of time.

The server 204 operates as an origin server in a content delivery network, while servers 208_1 operate as edge servers in the content delivery network. Client requests for ephemeral objects from the client devices 100 are serviced by the origin server 204 and/or one of the edge servers 208.

Figure 3:
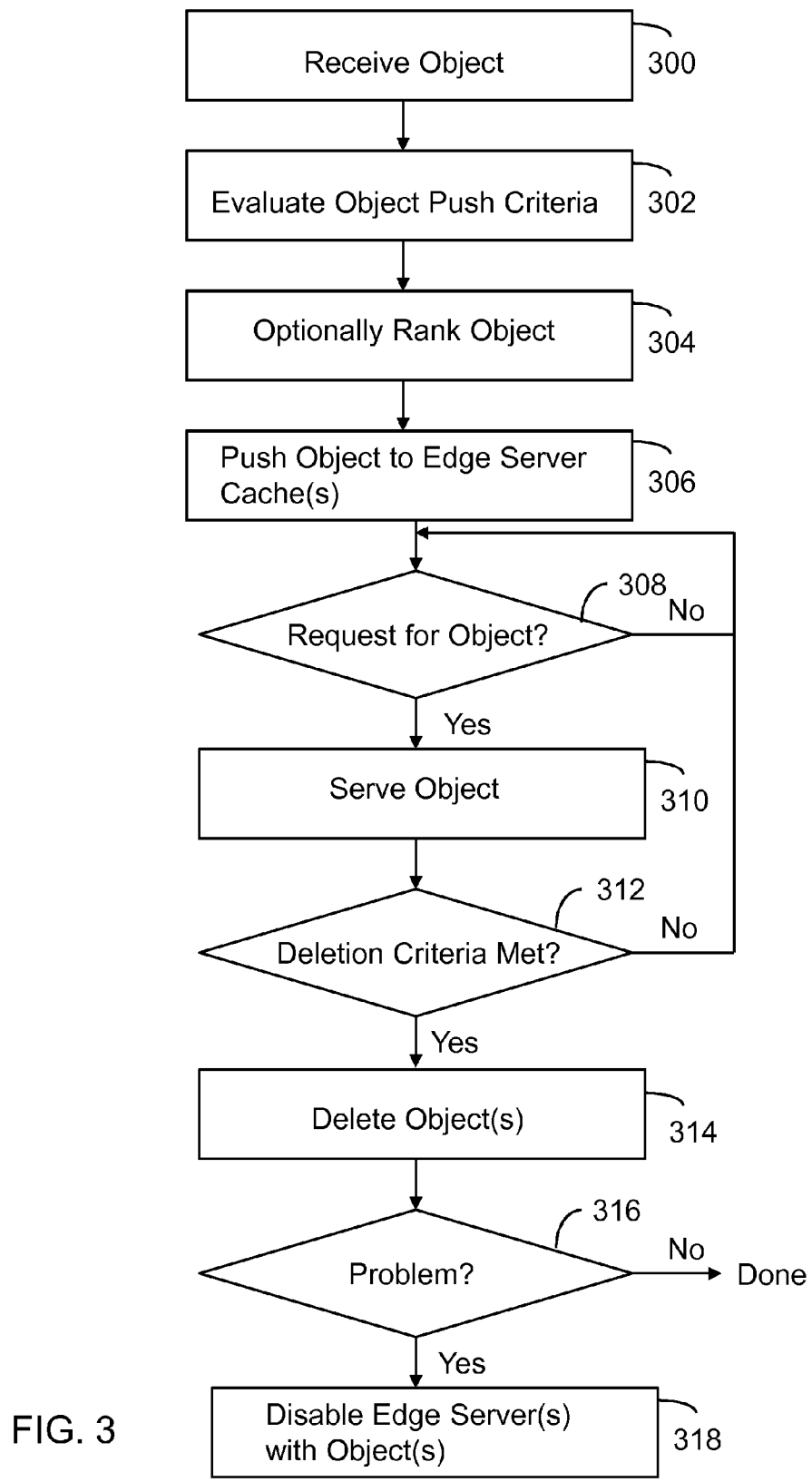
FIG. 3 illustrates processing operations associated with an embodiment of the invention.

FIG. 3 illustrates processing operations associated with an embodiment of the invention. Initially, an object is received 300. For example, a client device 100 generates an ephemeral photograph and associated text message, which is received by the server 204. The object may be a text message with an accompanying video or simply a photograph or video without a text message.

The origin object server module 222 evaluates object push criteria 302. In general, the push criteria specifies a set of policies for distributing the object to one or more edge servers 208 with the goal that a request for the object by a client device 100 is serviced by an edge server proximate to the client device 100. The object push criteria may include content delivery network traffic patterns. In this case, an object may be pushed to a specified edge server 208 for load balancing purposes.

The object push criteria may include historical use patterns of a user. The historical use patterns may assess how frequently a user processes objects, when a user processes objects (e.g., only at night) and other behaviors observed through prior consumption of ephemeral objects. Simple historical use pattern rules may be relied upon, such as push an object to an edge server only if the user hit that edge server in the last twenty-four hours.

The object push criteria may include a social graph associated with a user. In particular, a social graph and past history of communication between two users may be used to probabilistically deliver an object to an edge server that is likely to be accessed by a message recipient.

The object push criteria may also include geolocation information. The GPS processor 124 of client device 100 may deliver geolocation information to the origin object server module 222, which may be used to place an object at an edge server that is physically proximate to the geolocation of the user.

The next operation of FIG. 3 is to optionally rank the object 304. The ranking is for cache eviction management purposes. Observe that a Least Recently Used cache eviction protocol does not make sense because the object is being speculatively populated to the edge server cache. A ranking may be based upon historical use patterns of a user. For example, an object intended for a frequent user would be ranked higher than an object intended for an episodic user. Alternately, an object may be ranked based upon geolocation information such that objects pushed to edge servers close to the user are ranked higher than objects pushed to edge servers far from the user. The rank may be based upon available space versus the probability an object would be served from that edge server.

The next operation of FIG. 3 is to push the object to an edge server, such as an edge server cache 306. Observe here that the object is not sent to the edge server in response to a request, as is the typical case in a content delivery network. Rather, the object is speculatively pushed to the edge server based upon the object push criteria.

The next operation of FIG. 3 is to determine whether there is a request for the object 308. This condition may be tested at any number of edge servers. If there is such a request (308—Yes), the object is served 310. It is then determined whether deletion criteria is met 312. For example, the deletion criteria may dictate that the object is deleted after a single viewing of 3 seconds. Alternately, the deletion criteria may specify that the object is deleted after a specified number of views (either by a single individual or different individuals). Alternately, the deletion criteria may specify that the object is deleted after a specified period of time, such as 24 hours. If the deletion criteria is not met (312—No), the edge server waits for additional requests for the object 308. If the deletion criteria is met (312—Yes), the object or objects are deleted 314. This operation may entail deletion of the object at a number of edge servers. Therefore, the system determines if there is problem in the deletion process 316. For example, origin object server module 222 may supervise this deletion process. If there is no problem (316—No), then processing is complete. If there is a problem, (316—Yes), any number of remedial actions may be taken, including, if necessary, disabling any edge server containing the object 318. Different deletion strategies may be deployed. For example, one may delete every instance of the object except one instance, sever the one instance and then delete the final (one) instance. Alternately, the object may be served and then all deletion operations may be performed.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A computer implemented method, comprising:
   receiving an object scheduled for automatic deletion after a specified viewing period, a specified number of views or a specified period of time;
   evaluating object push criteria;
   pushing the object to an edge server cache in response to evaluating;
   serving the object in response to a request for the object; and
   deleting every instance of the object, wherein deleting comprises:
      deleting every instance of the object except one instance,
      serving the one instance, and
      deleting the one instance.

2. The computer implemented method of claim 1 wherein the object is a message.

3. The computer implemented method of claim 1 wherein the object is a message with an accompanying picture.

4. The computer implemented method of claim 1 wherein the object is a message with an accompanying video.

5. The computer implemented method of claim 1 wherein the object push criteria includes content delivery network traffic patterns.

6. The computer implemented method of claim 1 wherein the object push criteria includes historical use patterns of a user.

7. The computer implemented method of claim 1 wherein the object push criteria includes a social graph associated with a user.

8. The computer implemented method of claim 1 wherein the object push criteria includes geolocation information.

9. The computer implemented method of claim 1 further comprising ascribing a cache management rank to the object.

10. The computer implemented method of claim 1 wherein deleting is performed after serving the ephemeral object.

11. The computer implemented method of claim 1 further comprising checking for an object deletion problem.

12. The computer implemented method of claim 11 further comprising disabling an edge server in response to an object deletion problem.

\* \* \* \* \*